United States Patent [19]
Duncan et al.

[11] 3,831,248
[45] Aug. 27, 1974

[54] NUCLEAR REACTOR FUEL ROD SPLITTER

[75] Inventors: Robert Duncan; Francis Cellier, both of Columbia, S.C.

[73] Assignee: Westinghouse Electric Corporation, Pittsburgh, Pa.

[22] Filed: May 31, 1972

[21] Appl. No.: 258,332

[52] U.S. Cl. .................................. 29/200 D, 29/400
[51] Int. Cl. .................... B23p 19/00, B23p 17/00
[58] Field of Search .......... 29/200 D, 200 P, 400 N, 29/DIG. 42, 200 R, 200 J

[56] References Cited
UNITED STATES PATENTS

| | | | |
|---|---|---|---|
| 2,696,039 | 12/1954 | Baker | 29/200 D |
| 3,293,734 | 12/1966 | Buckley | 29/200 D |
| 3,434,191 | 3/1969 | Timmons | 29/200 P |
| 3,647,252 | 3/1972 | Nolin | 29/200 P |
| 3,657,786 | 4/1972 | Wiswell, Jr. | 29/200 P |
| 3,699,638 | 10/1972 | Van Dievoet | 29/400 N |
| 3,710,433 | 1/1973 | Brandestini | 29/DIG. 42 |

*Primary Examiner*—Thomas H. Eager
*Attorney, Agent, or Firm*—J. R. Campbell

[57] ABSTRACT

Apparatus for recovering fuel pellets from a fuel rod by cutting the rod lengthwise into two separate halves to allow fuel pellets therein to drop out of the rod cavity. A fuel rod is positioned in axial alignment with a stationary set of cutters on a table and a winch on the other end of the table pulls the rod through the cutters and in so doing, cuts a groove almost through the opposite sides of the rod. As the machine continues pulling the rod, it is caused to spread open and drop fuel rod pellets into a receptacle for later disposition The split halves of the fuel rod are then of a size and configuration convenient for efficient handling and disposal.

13 Claims, 10 Drawing Figures

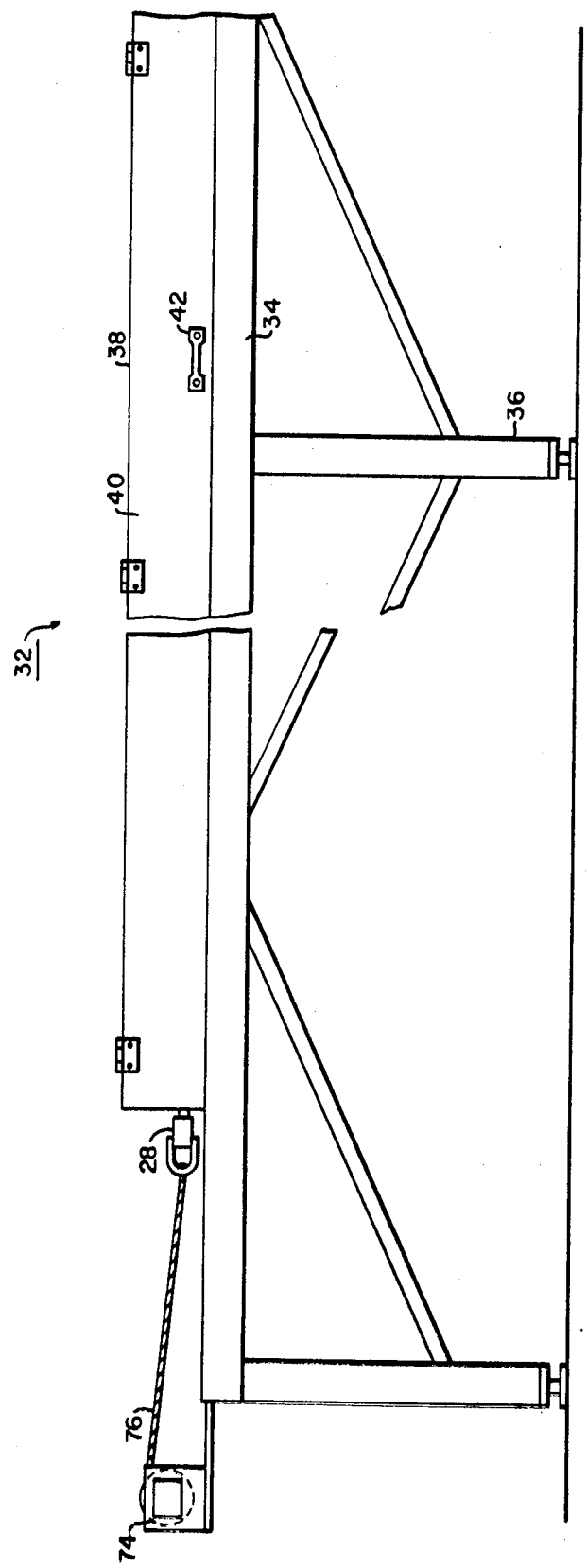

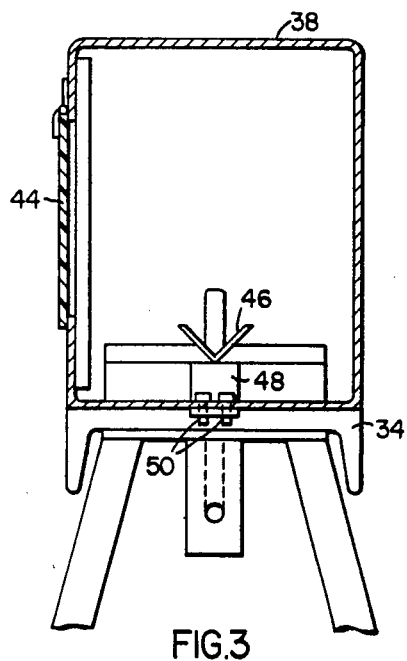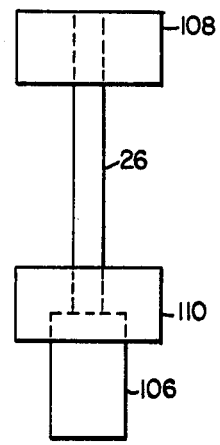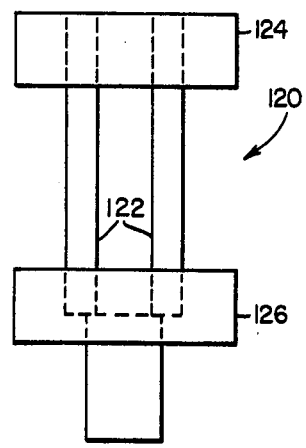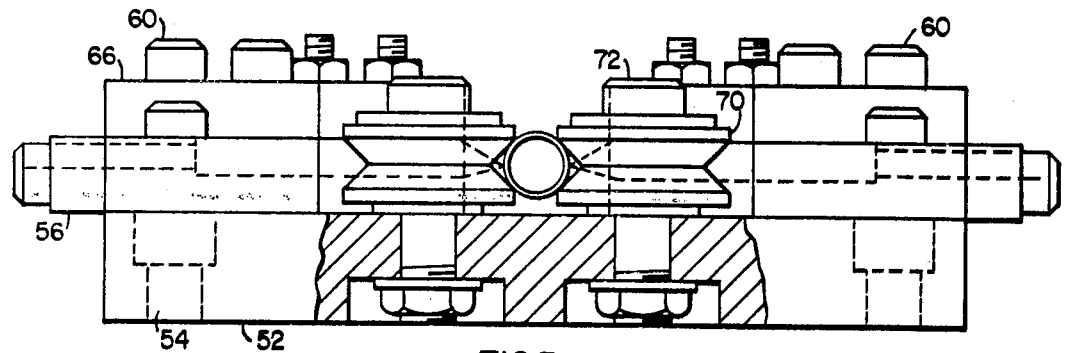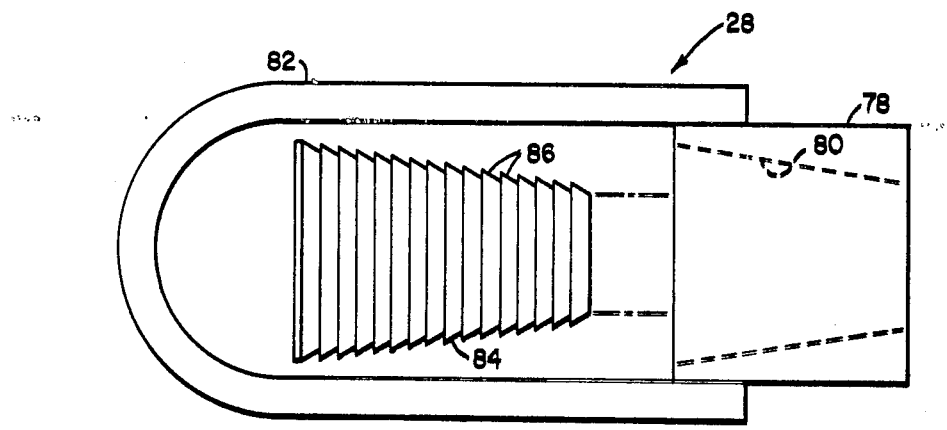

3,831,248

NUCLEAR REACTOR FUEL ROD SPLITTER

BACKGROUND OF THE INVENTION

All nuclear reactors utilize fissionable fuel to generate heat used for electric power producing or other purposes. The fuel consists of small cylindrical pellets of fissionable material positioned in end-to-end relationship in a zircaloy or stainless steel fuel rod. Depending on the design of the reactor, each rod which roughly measures about 12 to 14 feet long and has a diameter of 3/4 inch, contains about 240 fuel pellets. It is a significant fact that a moderately sized nuclear reactor of the type used for producing electric power, contains about 20,000 fuel rods and therefore more than 4.5 million fuel pellets.

During reactor operation and with the passage of time, the fuel slowly loses its ability to generate heat, and after a predetermined period of use, reactor efficiency dictates its replacement with fresh fuel. However, the slightly used fuel is still valuable and conventionally is reprocessed for further use in the same or other reactors.

One of the major problems encountered in recovering the used fuel relates to the technique followed in effecting its removal from the fuel rods. According to current practices, the fuel rods are cut cross-wise into short sections and the sections then deformed mechanically to gain access to the fuel pellets and thereby effect their removal. Although the pellets are very dense they nevertheless often fracture and produce chips and dust during the recovery process. Since it is radioactive, special precaustions must be observed for the protection of personnel. During the fuel recovery process, the fuel material becomes contaminated with metallic particles from the fuel rod which are objectionable since they must be removed before recycling of the fuel can take place.

On occasion, it is desirable to remove the pellets from fuel rods immediately after loading and before they are placed in a reactor, because poor welds on the rod ends, inadequate pressure in the fuel rod, and the like, precludes meeting established specifications. Salvage of the pellets in an undamaged form at that time is very important to minimize costs of the operation, but the same process described above is followed when such pellets do not slide out of the rod and the process is therefore subject to the same drawbacks.

The disadvantages inherent in the above-described prior art process of pellet removal are somewhat obvious. The radioactive fuel rod sections require special handling and the problem and costs of accumulating the destroyed sections and subsequently packing them for disposal can be very great. Special precautions must be observed in handling the used pellets and the dust which results from the pellet removal operation. In view of the large number of cross-wise cuts made along the fuel rod length to acquire sections of the desired size, metallic particles from the rod become mixed with the chips and other parts of the fuel pellets and these metallic particles must be removed before further processing of the fuel pellets can take place.

Moreover in those instances requiring recovery of unused pellets from defective fuel rods, the pellets recovered often are chipped or broken during the removal process thus requiring resintering before further use.

BRIEF SUMMARY OF THE INVENTION

Briefly stated, this invention eliminates the above disadvantages by providing a method and apparatus which splits a fuel rod containing fuel pellets along its entire length and causes the cut halves of each rod to separate and consequently permit the fuel pellets therein to drop into a receptacle. It will occur to those skilled in the art that appropriate shielding may be furnished the work space area and the receptacle for containing the harmful radiation rays emitted by the radioactive pellets, and that the split rods are of a size and configuration convenient for efficient handling and disposal.

An object of the invention therefore is to provide apparatus for reducing the salvage time required to remove fuel pellets from a fuel rod.

Another object of the invention is to provide apparatus capable of salvaging whole and unused pellets from a fuel rod before the rod is installed in a nuclear reactor.

Another object of the invention is to provide apparatus which will minimize the generation of radioactive dust occuring in the process of removing fuel pellets from a fuel rod.

BRIEF DESCRIPTION OF THE DRAWING

The subject matter of the invention is particularly pointed out and distinctly claimed in the concluding portion of this specification. The invention however, both as to organization and method of operation, together with further objects and advantages thereof, may best by understood by reference to the following description taken in conjunction with the accompanying drawing, wherein:

FIGS. 2A and 2B are views in elevation, illustrating the design of the fuel rod splitting machine;

FIG. 3 is a sectional view of the machine illustrated in FIGS. 2A and 2B;

FIG. 5 is a side view of the cutter illustrated in FIG. 4;

FIG. 7 is a view showing the design of a splitter used for assisting in the separation of both halves of a fuel rod; and FIG. 8 shows the design of a splitter spaced outwardly from the splitter shown in FIG. 7.

Referring now to the drawings wherein like reference characters designate like or corresponding parts throughout the several views, there is shown in FIG. 1 a general arrangement of the major components of the fuel rod splitting machine of this invention. The machine is designed to recover fuel pellets from a fuel rod by positively destroying the rod to effect such pellet recovery. To remove the pellets, welds on opposite ends of the rod are cut-off and a saw cut about 10 inches long is made on opposite sides of one end of the rod. As shown in FIG. 1, this rod 10 is then inserted through a bore 12 formed in a block 14 and in a manner to have the saw cuts formed on opposite sides of the rod fall into alignment with cutting tools 16 accurately positioned in a pair of cutter holders 18. The relationship of the parts are such that the cutting tool tips project into the saw cuts a distance equal to about .002 inch to .0010 inch from the rod inner surface. A pair of rollers 20 help to both align and guide the rod as it is drawn by a winch past the tool tips. The split ends 22 and 24 are then positioned on opposite sides of a splitting pin 26 and a clamping collar 28 is attached to the split ends of the rod. The clamping collar includes a U-shaped bar 30 welded at one end to the outside surface of the clamping collar while a cable extending from a winch not shown in FIG. 1, is connected to the other end.

Upon actuation of the winch, the rod is pulled through bore 12 and the oppositely disposed cutting tools 16 cut a groove which extends almost through the opposite side walls of the rod 10. Continued pulling by the winch separates the split ends 22 and 24 a distance sufficient to tear the uncut section of the rod walls and thereby permit the fuel pellets to drop from the rod into a tray. This operation continues until the rod has been completely cut along its length and separated into two halves. The fuel pellets thus collected in a tray are removed for futher processing and the split halves of the rod are then disposed of in the usual manner.

Figure 1:
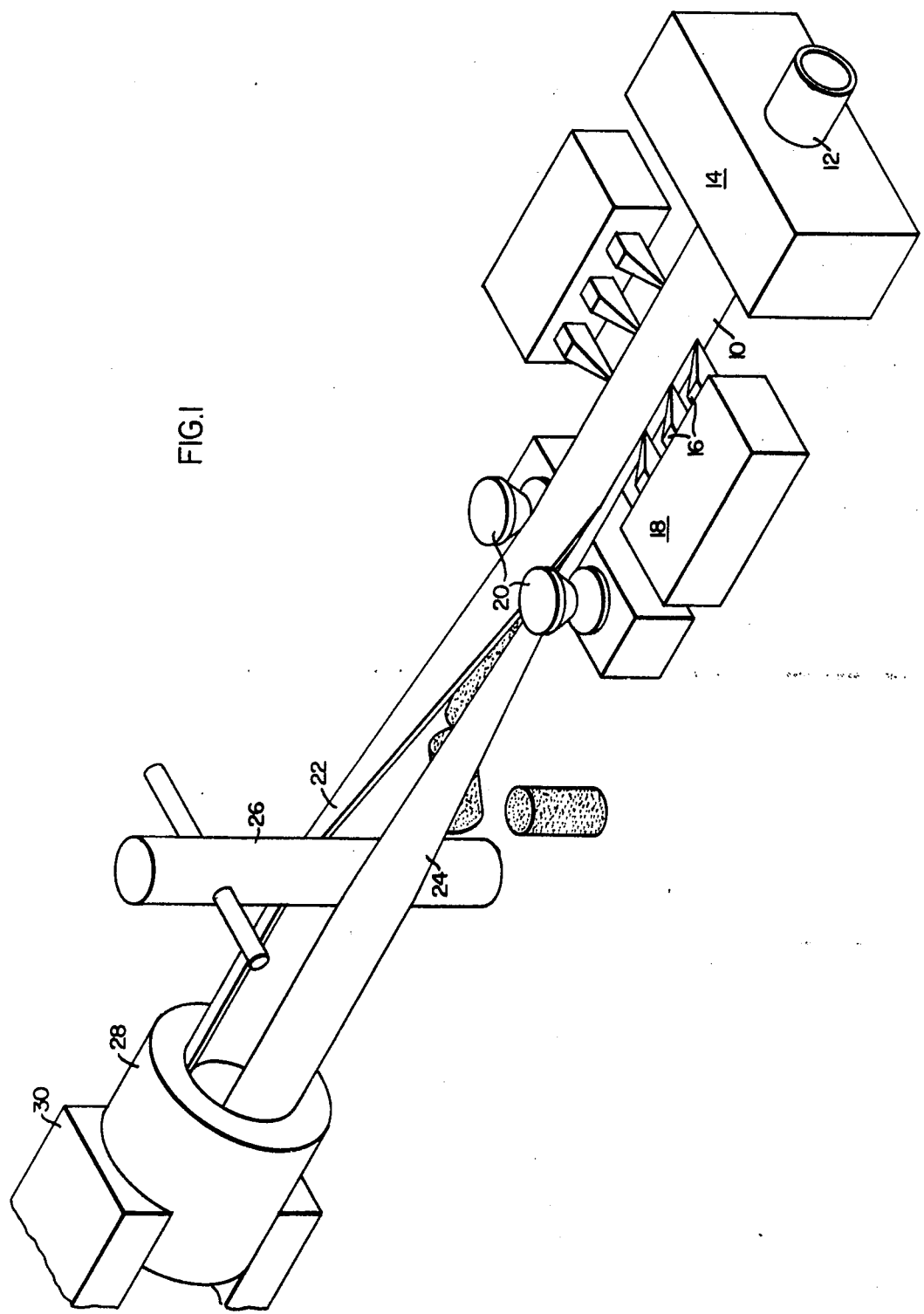
FIG. 1 is an isometric view generally showing the design of the fuel rod splitting device of this invention.
Figure 2B:
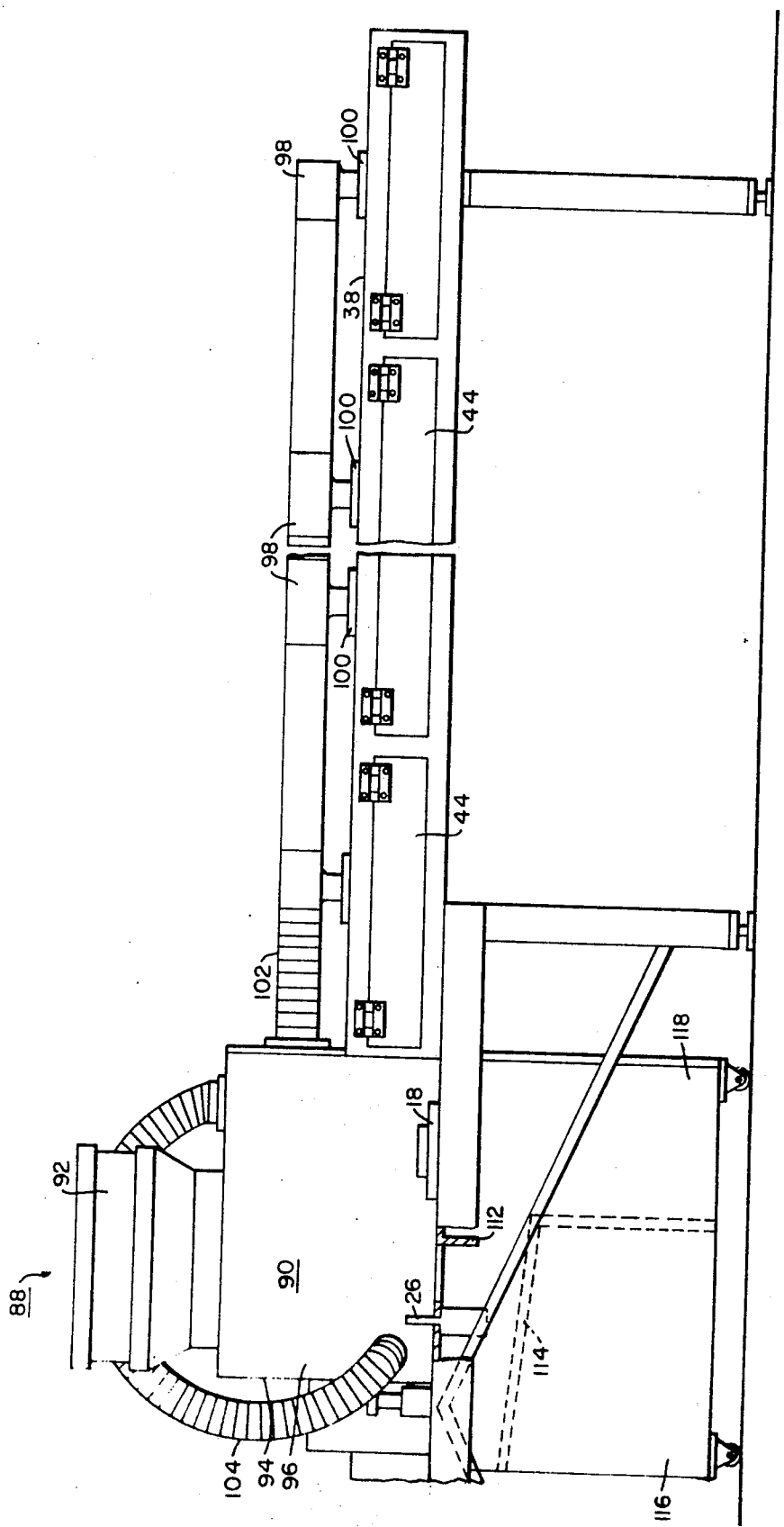

Referring more specifically to FIGS. 2 and 3, there is shown a table 32 comprising a long flat plate 34 having a surface which supports the fuel rod 10 and which is supported by adjustable legs 36. The cutting block 18 is mounted at about the mid-length of the table and a cover surmounts the complete table surface. The cover shown on the left side of FIG. 2 is made of sheet steel and each section includes a door 40 movable to an open position by handle 42. The cover shown on the right side is similarly designed except the doors 40 are made of plexiglass 44 or other transparent material to permit observation of the action of a fuel rod as it is fed into the cutting tool 18. To provide a base for movement of the fuel rod towards the cutting tools and to permit proper alignment of the rod with the tool bits, a V-shaped guide 46 is welded to a block 48 which in turn is attached to the table surface 34 by bolts 50 or other securing means.

Figure 4:
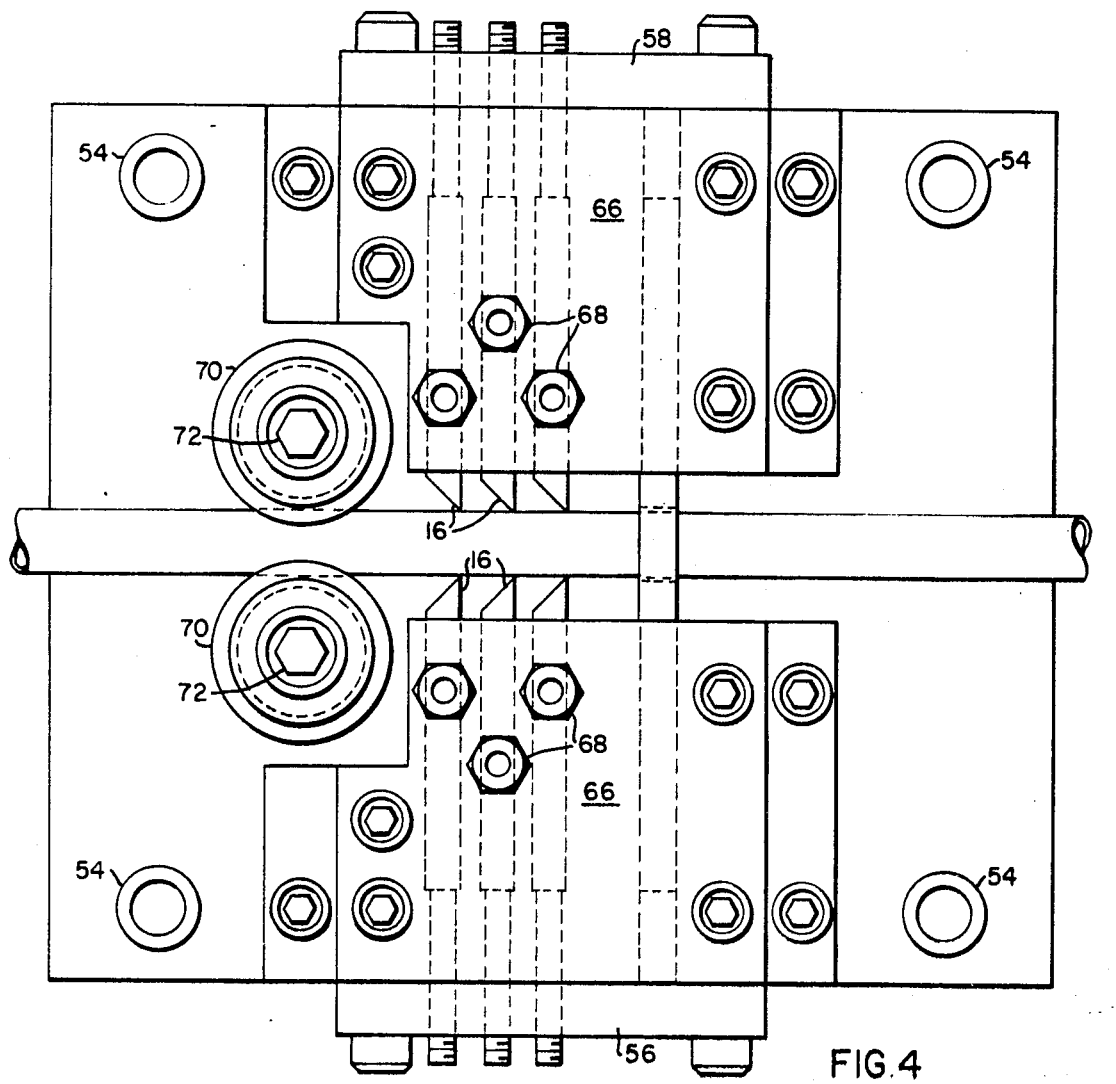
FIG. 4 is a plan view of a cutter used for cutting through the walls of the fuel rod as it is pulled through the cutter.
Figure 6:
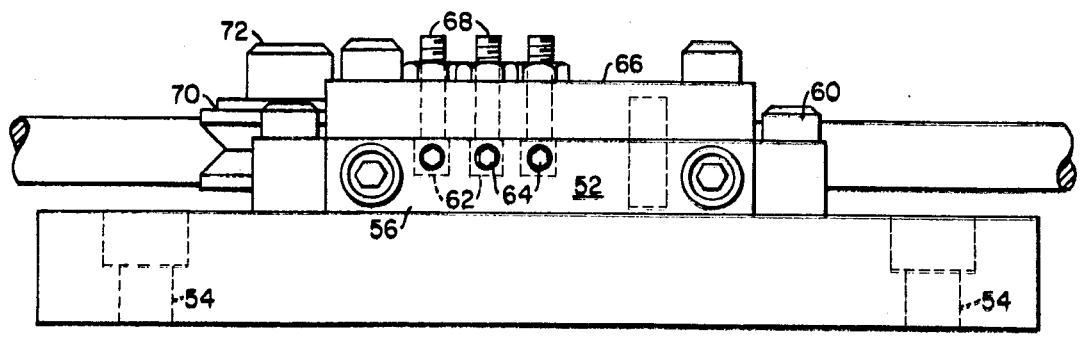
FIG. 6 is a front view in elevation.

The design of the cutting block used for cutting opposite side walls of a fuel rod as it passes therethrough is illustrated in FIGS. 4, 5 and 6. As shown, a cutting tool holder block 52 is attached to the table surface 34 by bolts 54. A pair of adjustable plates 56 and 58 mounted on block 53 are arranged for adjustable movement in a direction towards the fuel rod as shown in FIG. 4. These plates are secured to the block 52 by bolts 60. To firmly anchor the cutting tools 16 in a preset and accurate position, each of the plates 56 and 58 are provided with parallel grooves 62 as more clearly shown in FIG. 6, into which the cutting tools 16 are positioned. The cutting tools are then held in place by set screws 64 which are threaded into the end of each of the blocks. To prevent movement of the cutting tools 16 in a vertical direction when exposed to the force exerted thereon by the fuel rod as it is pulled through the cutting tools, additional plates 66 are respectively mounted over the cutting tools 16 and held in place by a nut and bolt arrangement 68. As the fuel rod is fed through the cutting tools, it is maintained in exact alignment therewith by a pair of guide rollers 20 secured to the plates by bolts 72.

As indicated above, each fuel rod is equipped with a saw cut of a length sufficient to extend from the cutting tools 16, through the guide rollers 20 and past a splitter rod 26 secured in the table surface. With the rod thus set in this position, it is ready to be pulled through the cutting tools 16 which impart a cut in the rod side walls. To accomplish this, a motor operated winch 74 of conventional design is mounted on an end of the table. The winch cable 76 terminates in clamping collar 28 which grasps the split ends of the rod 10 and pulls the rod through the cutting tools.

Referring to the clamping collar 28 illustrated in FIG. 9, it will be seen that the collar consists of a cylinder 78 having a conical shaped groove 80 bored therein. The U-shaped block 30 is welded or otherwise secured at one end to the cylinder 78 and cable 76 is adapted for attachment to its other end. The clamping collar is designed such that the opening 80 bored in the cylinder is of a size substantially greater than a wedge 84 having serrations or steps 86 designed to fit therein.

In assembling the clamping collar, cylinder 78 with its connected cable is drawn forwardly under cover 38 and slipped over the split ends 22 and 24 on opposite sides of bar 26. The ends are separated by a tool so that their outside surfaces lie along the bore walls 80. Wedge 84 is then inserted between the thus spaced ends and tamped into position to cause serrations 86 to frictionally engage the inner surfaces of the split ends. When the winch is rotated by its motor, cable 76 becomes taut as a result of the pulling force exerted on the clamping collar and the wedge 84 is drawn even more tightly into engagement with the inner surfaces of the split ends because the split ends tend to pull out of the cylinder 78. Continued operation of the winch causes the split ends to separate as they contact pin 26 and the pellets fall out of the rod.

A small amount of uranium dust results from the operation of removing pellets from the fuel rod. The dust is slightly radioactive and it therefore is important that personnel working with the equipment not breath in or ingest the dust thus generated. To minimize this possibility, a dust collector of conventional design is mounted above the rod cutting and end spreading area. The dust collector includes a housing 90 containing a motor operated blower, not shown, and filters 92 and 94, respectively, are placed on the inlet and discharge sides of the blower. The dust is collected in a dust accumulator section 96. To collect dust from the inside of cover 38, openings are cut in the upper surface of the cover at predetermined points along its length. These openings are closed by a T-type connector 98 secured to the cover top by mounting flanges 100. Flexible hoses 102 connect the T connectors with the inlet to the dust collector which then effectively draws the dust from the area enclosed by the cover. A second flexible tube 104 has its inlet located adjacent the tube splitter work surface area and its outlet terminates in the inlet to filter 92. By utilizing this kind of arrangement, dust particles are drawn from the area inside the cover and from the work surface area and deposited in the dust collector in a conventional manner.

As illustrated in FIG. 7, the splitter rod 26 is embedded in a block 108 rigidly attached to the top of the table. The rod further is equipped with upper and lower caps 108 and 110 spaced a distance to provide adequate clearance for the split ends of a rod passing therethrough, thus effectively requiring the rod to stay in alignment with the cutting tools and the caps preclude split end displacement in a vertical direction.

As the split ends of a rod pass on opposite sides of the splitter rod 26, the split ends will separate a distance to permit pellets to fall from the tube onto the table surface, and from there through a slot 112 onto a tray 114 having holes therein of a size less than the size of a pellet. The plate may or may not be vibrated to cause the dust particles and small chips to fall through the holes into a container 116, while the pellets fall off the end of the plate into a storage area 118. When the dust collector is full, it may conveniently be wheeled to a remote area for unloading and final disposition of the dust and pellets contained therein.

To help assure that the rod ends will be separated a required distance, a second rod splitter 120 of similar design may be substituted for rod splitter 26 by mounting it in the same position on the table top. The splitter illustrated in FIG. 8 shows that a pair of splitter rods 122 may be utilized and their ends are embedded in upper and lower caps 124 and 126. As a rod leaves the end of rod splitter 26, the spaced halves of the rod then pass to the outside of rod 122 thereby assuring that the rod will be split the required distance.

In operation, when it is desired to remove the pellets from a fuel rod which has not been used in a reactor or to remove the pellets from a fuel rod which has been used in a reactor, the welds on the end of a rod are cut-off and a saw cut approximately 10 inches long is then made in the end of the rod. The saw cut end is then inserted through opening 12 in block 14 and pushed forwardly so that the cutting tools 16 have their ends projecting into the opposite sides of the saw cut made in the rods. The rod is then pushed forwardly through rollers 20 and into a position where the split ends 22 and 24 are positioned on opposite sides of rod splitter 26. Clamping collar 28 is placed over the open ends of the split rod, the ends separated and wedge 84 then tamped into position. The winch motor is started and as the cable grows taut, it firmly locks the split ends of the rod in the clamping collar. As the winch pulls the fuel rod forwardly, the cutting tools 16 cut a groove in the opposite side walls of the rod and as the rod split ends are pulled past rod splitters 26, or splitter 122 if used, the split ends separate and the pellets drop from the tube through opening 112 into pellet collector 118. This operation continues until the rod has been separated along its complete length. The blower motor in the dust collector 90 desirably runs continuously and therefore draws a suction on the area inside the cover 38 and from that working space immediately adjacent the point where the fuel rod is separated by tube splitter 26. Such suction causes dust to travel through flexible tubes 102 and 104 to the dust collector where the dust is filtered and separated into a compartment for further removal and disposition.

In view of the above it will be apparent that many modifications and variations may be made to the disclosed construction in light of the above teachings. It therefore is to be understood that within the scope of the appended claims, the invention may be practiced other than as specifically described.

What is claimed is:

1. A fuel rod splitting machine comprising:
 a base supporting a guide block and having means thereon for guiding a fuel rod therethrough;
 a fuel rod pulling device on an end of said base and spaced from said block;
 means connecting said device to an end of said rod; and
 fuel rod cutting means on said base in alignment with said block and said device,
 whereby upon actuation of said device, said rod is pulled through said block and the cutting means imparts at least one cut in said rod to permit recovery of fuel pellets therein.

2. The machine according to claim 1 wherein said fuel rod cutting means are positioned on opposite sides of said fuel rod to cut a groove almost through the walls as the fuel rod is pulled therethrough.

3. A fuel rod splitting machine comprising:
 a base supporting a block having guide means thereon of a size sufficient to accept a fuel rod;
 cutting means on said base adjacent said block for broaching a groove along the length of and on opposite sides of said rod;
 a pulling device in alignment with said cutting means and block and having a connector on an end thereof attachable to said rod; and
 a splitter device between said cutting means and the pulling device;
 whereby said cutting means broaches a groove on opposite sides of the rod as it is pulled through the block, and said splitter device divides the rod into at least two sections to cause the fuel pellets therein to fall from the rod in an undamaged condition.

4. The machine according to claim 3 wherein said cutting means includes a pair of oppositely disposed tool bits spaced a distance to cut grooves in opposite sides of said block.

5. The machine according to claim 4 wherein said guide means includes a pair of guide rollers mounted on the base adjacent said cutting means for maintaining alignment of the rod with respect to said tool bits.

6. The machine according to claim 3 wherein said pulling device comprises a winch, a power driven cable on said winch having an end attached to said connector for pulling said rod through the cutting means.

7. The machine according to claim 5 wherein said connector includes a U-shaped bar having an open cylinder bonded to the bar ends, and means adapted for insertion in said cylinder for locking the broached ends of said rod between the inner surfaces of the cylinders and said insertion means.

8. The combination according to claim 7 wherein said means inserted in said cylinder comprises a conical-shaped plug having serrations on its peripheral surface, the arrangement being such that the serrations on said plug frictionally engage the broached ends of the rod and hold them fast between the plug serrations and the inner walls of the cylinder.

9. The machine according to claim 3 wherein said splitter comprises at least one pin secured on the top surface of said base, said pin being in alignment with said rod to further separate the broached ends when the device pulls the rod through said cutting means.

10. The machine according to claim 3 wherein a pair of splitter rods are mounted on the base, said pins being oriented in a direction perpendicular to the axis of said rod to assist in separating the broached rod sections and thereby cause the pellets to fall from the rod.

11. The machine according to claim 3 wherein a receptacle is located on said base to catch the pellets and dust as they fall from said rod.

12. The machine according to claim 3 wherein a cover surmounts said base and has its inner walls spaced a distance therefrom sufficient to permit movement of a fuel rod therethrough;
- a dust collector mounted on said base, said dust collector having tubes with an inlet positioned adjacent said cutting means;
- a motor operated blower in said dust collector for drawing a suction on the dust and metal particles to draw them into said dust collector; and
- filter means in said dust collector for collecting said particles.

13. The machine according to claim 12 wherein openings are formed in the cover overlying said fuel rod, tube means connected to said openings at one end and terminating at their outer end in said dust collector;
- whereby as said blower operates, dust particles inside said cover are drawn through said tube and deposited in said dust collector.

* * * * *